Figure 1:
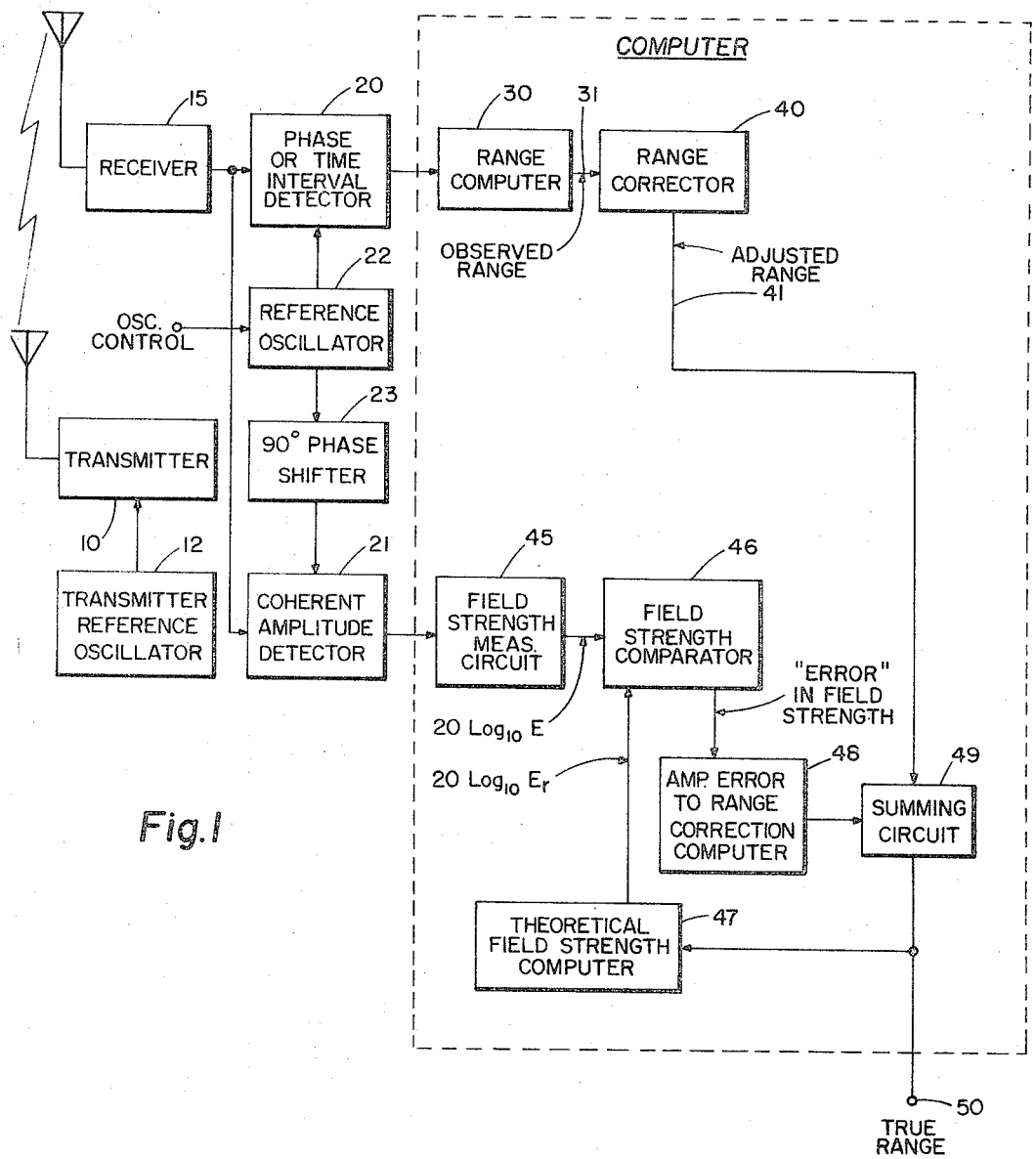

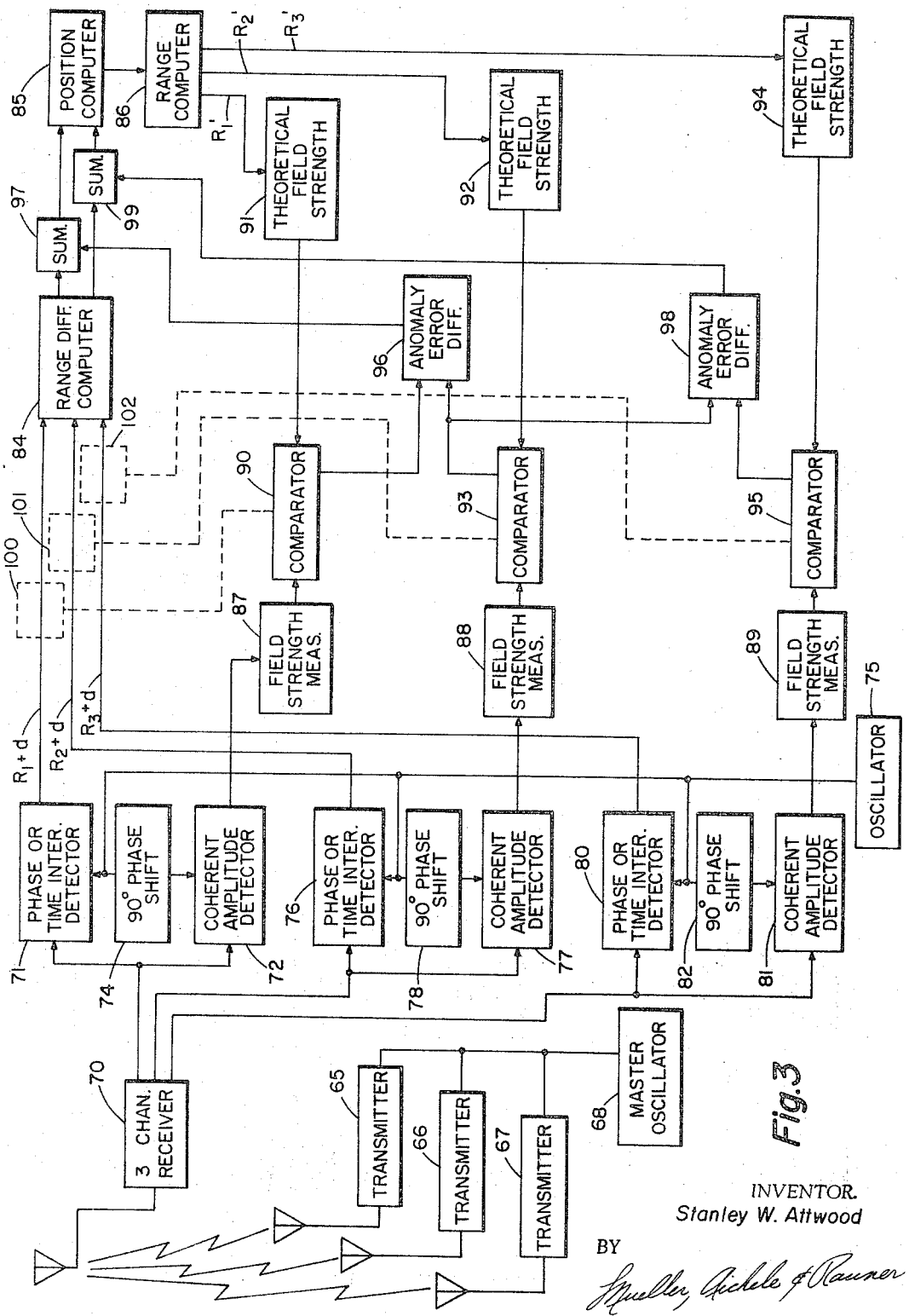

United States Patent Office 3,307,192
Patented Feb. 28, 1967

3,307,192
NAVIGATION SYSTEM
Stanley W. Attwood, Scottsdale, Ariz., assignor to Motorola, Inc., Franklin Park, Ill., a corporation of Illinois
Filed Mar. 26, 1965, Ser. No. 442,888
18 Claims. (Cl. 343—112)

This invention relates generally to radio navigation systems, and more particularly to systems for reducing errors when deriving the range and the field strength from received radio signals.

Radio navigation systems have used the time delay or change in phase of radio signals from a transmitting to a receiving station to determine the range to the receiving station and/or the position of the receiving station. However, such systems have been subject to errors resulting from phase and amplitude distortion of the received signal as it is transmitted through a non-homogeneous environment. Accordingly, the range or position information derived from such radio signals has an anomaly error which has rendered the information incorrect and of questionable value in certain applications. Although certain adjustments for error in range can be made from available statistical information, as to compensate for the curvature of the earth and other physical factors, unknown and continuously changing conditions produce anomaly errors which cannot be corrected in this way.

It is, therefore, an object of the present invention to provide a system and method for reducing anomaly error in radio navigation systems.

Another object of the invention is to provide a radio system which derives information from two characteristics of a received radio signal wherein the information is related to known information to provide a correcting signal to reduce the error in one or both pieces of information.

A further object of the invention is to provide a radio navigation system and method for determining the range or position of a station, wherein information derived from the amplitude of the received signal is used to reduce anomaly error in the observed range or position measurement to correct the same.

Still another object of the invention is to provide a system for adjusting the observed strength of a received signal to reduce anomaly error in the signal strength on the basis of variation of the measured range from the known range.

A feature of the invention is the provision of a range determining system and method wherein the range is computed from the phase or time delay of the received signal, and wherein the field strength of the received signal is measured and the theoretical field strength is computed from the computed range and the known power of the transmitter, with the measured and theoretical field strengths being compared to produce an anomaly error correction factor for the computed range to produce the true range.

A further feature of the invention is the provision of a system and method wherein the range is first adjusted on the basis of known characteristics, such as the curvature of the earth and the propagation characteristics over the range involved, and then is further corrected to reduce the anomaly error on the basis of the relation of the measured field strength as compared to the theoretical field strength computed from the range.

Another feature of the invention is the provision of a range difference navigation system wherein the field strengths of received signals are measured and theoretical field strengths are computed and compared to derive an anomaly error correction which is applied to the range difference signals to reduce the anomaly error therein.

Still another feature of the invention is the provision of a system and method for determining the power of a transmitter from the signal at a receiver, wherein the field strength and the range are determined from the received signal, and said range so obtained is compared with the known true range to find the anomaly range error, with the anomaly range error being converted to an amplitude correction and applied to the measured field strength to determine the true radiated power.

Figure 2:
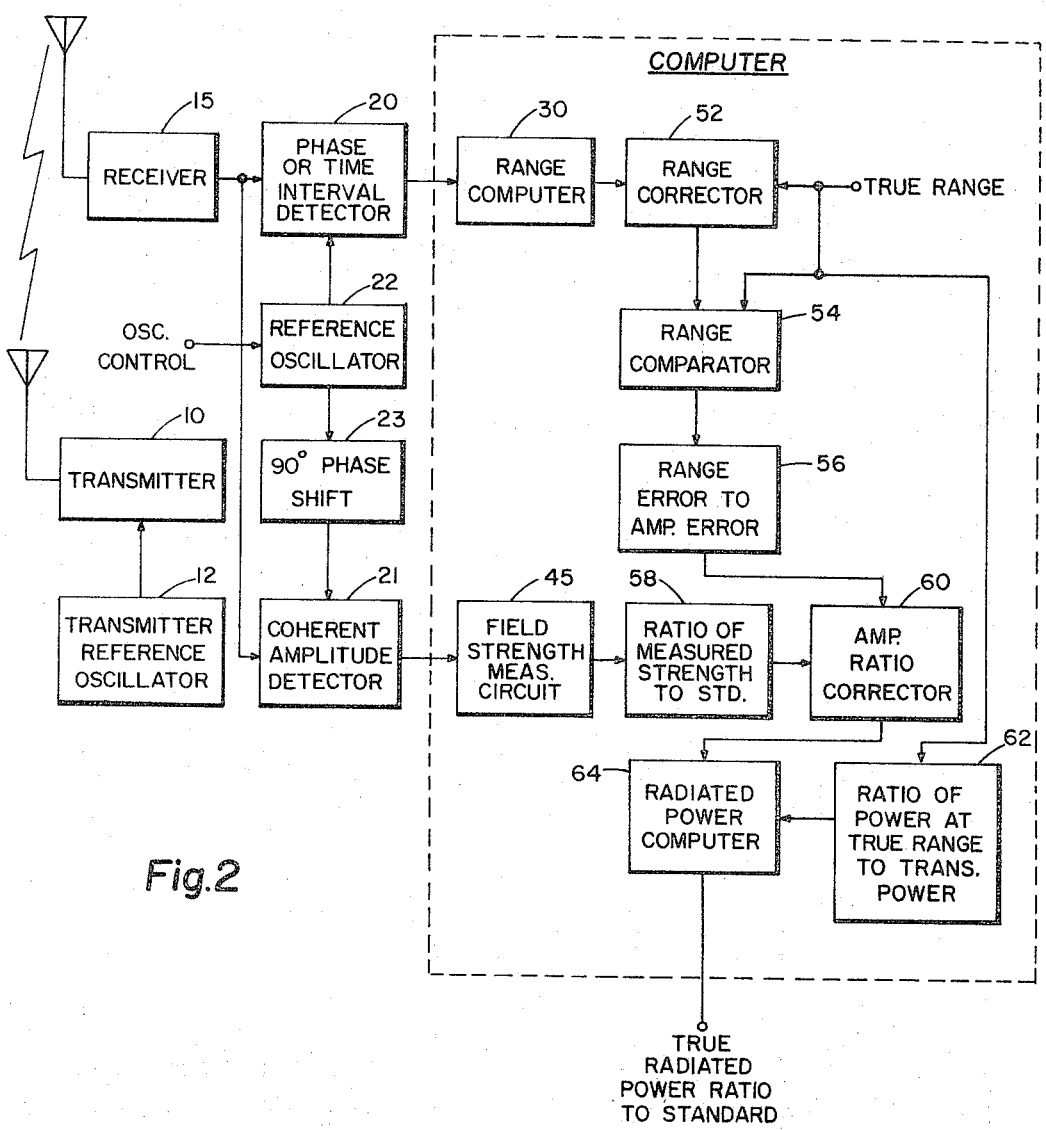

The invention is illustrated in the drawings wherein:
FIG. 1 is a block diagram of a radio system for correcting the observed range to provide the true range;
FIG. 2 is a block diagram of a radio system for utilizing the field strength as measured at the receiver to provide the true radiated power at the transmitter; and
FIG. 3 is a block diagram of a radio navigation system for determining position in a range difference system.

In practicing the invention, the radio signal received by a navigation receiver is applied to a phase or time interval detector to derive an indication of time delay, with this being converted to an observed range measurement in a computer. The observed range is corrected for known propagation characteristics to provide an adjusted range. The received signal is also applied to an amplitude detector for providing an indication of field strength. To correct the adjusted range for anomaly error, the theoretical field strength is computed from the adjusted range (or the observed or corrected range) and the known transmitter power. This is compared with the actual field strength which is measured to derive the anomaly amplitude error in the field strength. The anomaly amplitude error is converted to an anomaly range correction in a computer and applied to the adjusted range to produce the true range. The true range may be used to compute the theoretical field strength to provide greater accuracy. A single general purpose computer operating from the time delay and the amplitude information obtained from the received signal can provide the various operations required.

Range difference signals derived from radio signals in a position determining system can be corrected for anomaly error by a correction factor determined from the measured and theoretical field strengths as set forth above.

In the event that the true range is known and it is desired to determine the true radiated power at the transmitter, the adjusted range is compared wih the true range to produce the anomaly range error, and this is converted to an amplitude correction. The amplitude correction is applied to the signal power information obtained from the observed field strength to correct the same. The field strength may be related to a standard power, and the received power may be related to the radiated power by use of information as to the true range, so that the system provides an output corresponding to the true radiated power at the transmitter.

Referring to FIG. 1 of the drawings, there is shown a radio system in accordance with the invention including a transmitter 10 and a receiver 15. The transmitter is controlled by a stable oscillator 12. The transmitter may radiate a CW signal, or a coded signal for use in ambiguity resolution.

The receiver 15 may be of any type which will receive the wave from the transmitter 10 and will provide an output wave which is a linear function of the amplitude and phase of the incident wave from the transmitter. The receiver may be carried by a vehicle such as an airplane. The output wave of the receiver is applied to a phase (or a time interval) detector 20 and to a coherent amplitude detector 21, to which are applied reference waves from a reference oscillator 22. The reference oscillations are applied to the phase detector 20 in phase quadrature with the received signal, and to the coherant amplitude detector 21 in phase with the applied signal. This quadrature phase shifting is accomplished by the phase shifter 23. These circuits are of known form.

In the system of FIG. 1, the reference oscillator 22 must be controlled to hold the same synchronized with the oscillator 12 at the transmitter. This control may be accomplished by any known means, such as that described in Groth Patent No. 3,150,372, issued September 22, 1964.

The output of the phase detector 20, which may be a direct current voltage, is applied to a range computer 30 which may be of known construction. This computer may be provided by any general purpose digital computer such as the IBM 704 Data Processing System manufactured by International Business Machines Corporation. This computer utilizes the signal applied thereto from detector 20 and converts it to an observed range 31. This observed range is applied to a range corrector 40, which may be of the type described in the Groth Patent No. 3,150,372 and identified by numeral 35 in FIG. 3 thereof.

As stated in the Groth patent, charts providing information for range correction are available from the National Bureau of Standards, with one such chart being NBS Circular 573, issued June 26, 1956. These corrections may be applied to the corrector 40 to adjust the observed range signal to provide an output at 41 which is referred to as the "adjusted range." Such corrections may be easily applied to this system because the corrections which may be required are functions of the direction range from the transmitting station to the receiver. As these ranges are directly determined in the system, the corrections may be applied directly. In systems where the ranges are not directly determined for the basic computation, it may be necessary to determine the ranges to apply the corrections.

The output of the coherent amplitude detector 21 is applied to a field strength measuring circuit 45. This circuit provides a voltage which is proportional to $20 \log_{10} E$, where E is the magnitude of the received signal at the antenna as derived by the amplitude detector 21.

The adjusted range at 41 is applied through a summing circuit 49 to the theoretical field strength computer 47. In addition to the range information from circuit 49, information as to the power of the transmitter 10 is applied to the theoretical field strength computer. With this information the computer produces a theoretical field strength which is proportional to $20 \log_{10} E_r$, where $E_r$ is the theoretical value of field strength.

The measured field strength from unit 45 and the theoretical field strength from unit 47 are applied together to comparator 46. The comparator provides an output signal from the two input signals which is in the form $20 \log_{10} E/E_r$ This is the error in the field strength as measured with respect to the theoretical field strength as computed. This error in amplitude is converted to an equivalent range correction in the amplitude error to range error correction computer 48. In most cases the relation between the field strength error and the range error will be linear and a simple conversion from field strength error to range error can be made. However, field testing of various systems may reveal a more refined functional relationship such as a higher order polynomial as follows:

$$\Delta R = k_1(20 \log_{10} E/E_r) + k_2(20 \log_{10} E/E_r)^2 + \text{etc.}$$

In the above fomula, $\Delta R$ is the range correction, and $k_1$ and $k_2$ are constants which can be determined for the specific systems.

The anomaly range correction is applied from computer 48 to the summing circuit 49. The anomaly correction is applied to the adjusted range on line 41 to provide the true range at output 50.

As stated above, the range computer 30 and the range corrector 40 may both be provided by a general purpose computer. Actually a single computer may be programmed to provide the additional operations of the field strength measuring circuit 45, the comparator 46, the theoretical field strength computer 47, the amplitude error to range error correction computer 48, and the summing circuit 49. That is, the output of the phase detector 20 and the output of the coherent amplitude detector 21 may be applied to the computer which is programmed with information for the range correction and as to the transmitted power, and the computer can provide the various computations required to provide the true range, as has been described.

In the system of FIG. 2, the true range is known and the true radiated power at the transmitter is to be determined. The system of FIG. 2 uses the same principle for reducing anomaly error as the system of FIG. 1, and has many of the same components. Components which are the same are given the same numbers. The received signal is used to derive a range measurement by action of the phase detector 20 and the range computer 30, and to provide a field strength measurement by action of the detector 21 and the field strength measuring circuit 45. The output of range computer 30 is applied to range corrector 52. This applies the same corrections as range corrector 40 in the system of FIG. 1, but as the true range is known the correction can be based on this rather than on the observed range signal at the output of computer 30. The range corrector 52 provides an adjusted range output which is applied to the range comparator 54. The true range is also applied to the range comparator 54 so that the range error is derived at the comparator output. The range error is converted to an amplitude error by computer 56. That is, the anomaly range error is converted to an anomaly amplitude correction factor. This is the inverse of the conversion made by the computer 48 in the system of FIG. 1.

Although the field strength produced by the measuring circuit 45 can be directly corrected by the amplitude error correction factor derived by computer 56, it may be preferable to convert the field strength measurement to a ratio which relates the fiend strength to a standard level. This may be considered a calibration of the field strength and can be produced by a computer section 58. The anomaly amplitude error correction factor is applied to the field strength ratio by computer section 60 to remove the anomaly error. To convert the field strength to transmitter power, a computation of the ratio of the radiated power at the transmitter to the signal power at the receiver must be made. This depends on the true range from the transmitter to the receiver which is known. This computation is accomplished by computer section 62 to which the true range is applied. This ratio together with the corrected ratio of the measured field strength is applied to computer section 64, the output of which is the true radiated power at the transmitter as related to the standard level or calibration referred to above.

The anomaly error reduction system of the invention can be used in many applications, such as in any radio navigation system. For example, the system can be used to correct the range measurements in the navigation system described in Groth Patent No. 3,150,372, referred to above. The correction can also be applied in a simple ranging system, with the corrections being applied to the round trip measurement of time delay. In a transponder system, the transponder must measure and transmit the field strength to the computer to provide the information for range correction. In all such cases, the radiated power must be accurately known since this is required to calculate the theoretical field strength.

In FIG. 3 a range difference navigation system is illustrated for providing information as to the position of a station, based on the differences in range of the station from a plurality of fixed stations. The transmitters 65, 66 and 67 may be located at a plurality of different fixed positions and transmit signals which are derived from signals generated by oscillator 68. The signals from the three transmitters may be coded for station identification, and may be transmitted on a time or frequency shared basis or in any other known arrangement.

The receiver 70, which may be in a movable vehicle, receives signals from the three transmitters, and has three channels which reproduce the three received signals. The signals from the first channel (transmitter 65) are applied to phase (or time interval) detector 71 and coherent amplitude detector 72. Oscillator 75 provides signals to the phase detector 71, and through 90° phase shifter 74 to detector 72. This portion of the system may be the same as the phase detector 20, amplitude detector 21, reference oscillator 22 and phase shifter 23 in the system of FIG. 1. Signals from the second channel (transmitter 66) are applied to phase detector 76 and coherent amplitude detector 77, with local oscillations from oscillator 75 being applied directly to the phase detector 76 and through 90° phase shifter 78 to the amplitude detector 77. Similarly, signals from the third channel (transmitter 67) are applied to phase detector 80 and coherent amplitude detector 81, and local oscillations are applied from oscillator 75 to the phase detector 80 and through phase shifter 82 to the coherent amplitude detector 81. It will be noted that the same oscillator 75 is used for the detectors of all three channels.

The output of the phase detector 71 is a measure of the range between transmitter 65 and receiver 70, plus the difference in phase between the transmitter oscillator 68 signals and the receiver oscillator 75 signals. This phase differential is designated $R_1+d$, where $d$ is the difference in phase between the two oscillators. The output of phase detector 76 is a measure of the range between the transmitter 66 and receiver 70 plus the difference in phase between the oscillators, or $R_2+d$. The output of phase detector 80 is a measure of the range between transmitter 67 and receiver 70 plus the difference in phase between the oscillators, $R_3+d$. The difference in phase $d$ is the same for each measurement, and by using the difference in the ranges from two fixed stations, this item can be eliminated. It is therefore not necessary to control the oscillator 75 to synchronize the same with the transmitter oscillator.

The three range outputs are applied to the range difference computer 84. This computer has outputs which provide two range differences, $R_{12}$, which is the difference in the ranges from transmitter 65, and transmitter 66, and range difference $R_{32}$, which is the difference in ranges from transmitter 67 and transmitter 66. It is well known that the position of the receiver can be computed from the two range difference signals and the locations of the three transmitters, and this computation is provided by position computer 85. This may provide the rectangular coordinates of the position, or the latitude and longitude, etc. With the position of the receiver known, the ranges from the three transmitters to the receiver can be computed and this is accomplished by range computer section 86.

As in the system of FIG. 1, the coherent amplitude detectors 72, 77 and 81 provide an amplitude signal from which the field strength of the received signal can be determined. The field strengths for the three received signals are computed by field strength measuring circuits 87, 88 and 89 respectively. The field strength for the signals received from transmitter 65 is derived by measuring circuit 87 from the output of detector 72. The theoretical field strength based on the computer range $R_1'$ from the transmitter 65 is derived by computer 91. These two field strength signals are compared in comparator and computer 90 to derive the field strength anomaly error. This is converted in the computer 90 to an anomaly range error, as has been described in the system of FIG. 1.

Similarly, the field strength measurement of the signal from transmitter 66 is derived in field strength measuring circuit 88, and a theoretical field strength computed from the range $R_2'$ is derived by computer 92. These two signals are compared in comparator and computer 93 to provide a second field strength anomaly error for the transmission from transmitter 66. The field strength of the signal from transmitter 67 is measured in circuit 89, and the theoretical field strength derived from range $R_3'$ is developed by computer 94, with the measured and theoretical field strengths being compared in comparator and computer 95.

The anomaly range errors derived by comparators 90 and 93 may be subtracted in section 96 to obtain the range difference anomaly error. This error is applied to summing circuit 97 to correct the range difference signal $R_{12}$. Similarly, the anomaly range errors from transmitters 66 and 67 derived by comparators 93 and 95 are subtracted in section 98 to obtain the anomaly error in the range difference signal $R_{32}$, and this is applied to summing circuit 99 to correct the range difference signal. The two corrected range difference signals are applied to the position computer 85 so that the anomaly error is removed from the position derived by the position computer 85.

As shown by the dotted lines in FIG. 3, the anomaly range errors can be applied to the ranges obtained from the phase detectors if this is desired. The anomaly range error from comparator and computer 90 can be applied to summing circuit 100 to correct the range $R_1+d$, and similarly the anomaly range errors from computers 93 and 95 can be applied to the summing circuits 101 and 102 respectively to correct the ranges $R_2+d$ and $R_3+d$. As the anomaly error from the individual ranges are thus corrected the range differences $R_{12}$ and $R_{32}$ will be corrected so that the position as derived by computer 85 will be accurate.

The system of the invention makes it possible to substantially reduce anomaly error, to thereby render navigation systems more accurate. The anomaly errors have various sources and are not susceptible to measurement. Further, the errors continually change, and the correction system of the invention follows the errors and acts to reduce or eliminate the same.

I claim:

1. A system for measuring the range and field strength from signals received at a radio receiver including in combination, range determining means coupled to the receiver and responsive to the received signals for producing a first signal which is a measure of the observed range, field strength measuring means coupled to the receiver and responsive to the received signal for providing a second signal representing the field strength of the received signal, computer means responsive to one of said first and second signals for computing therefrom a third signal which forms a measure of the anomaly error in the other of said first and second signals, and error corrector means responsive to said third signal for correcting the other of said first and second signals to provide a corrected output signal.

2. A radio range and field strength measuring system for use with a radio receiver including in combination, range determining means coupled to the receiver and responsive to the received signals for producing a first signal which is a measure of the observed range, range corrector means coupled to said range determining means for compensating said first signal for predetermined characteristics of the observed range to provide a second signal representing the adjusted range, field strength measuring means coupled to the receiver and responsive to the received signal for providing a third signal representing the field strength of the received signal, computer means responsive to one of said second and third signals for computing therefrom a fourth signal which forms a measure of the anomaly error in the other of said second and third signals, and error corrector means responsive to said fourth signal for correcting the other of said second and third signals to provide a corrected output signal.

3. The method of measuring the range and field strength from signals received at a radio receiver including the steps of, deriving from the received signals a first signal which is a measure of the observed range, deriving from the received signal a second signal representing the field strength of the received signal, computing from one of said first and second signals a third signal which forms a measure of the anomaly error in the other of said first and second signals, and combining said third signal with the other of said first and second signals to provide a corrected output signal.

4. The method of measuring the range and field strength from signals received at a radio receiver including the steps of, deriving from the received signals a first signal which is a measure of the observed range, compensating said first signal for known characteristics thereof to provide a second signal, deriving from the received signal for providing a third signal representing the field strength of the received signal, computing from one of said second and third signals an error signal which forms a measure of the anomaly error in the other of said second and third signals, and combining said error signal with the other of said second and third signals to provide a corrected output signal.

5. A range measuring system for use with a radio receiver including in combination, range determining means coupled to the receiver and responsive to the received signals for producing a first signal which is a measure of the observed range, field strength measuring means coupled to the receiver and responsive to the received signal for providing a second signal representing the field strength of the received signal, computer means responsive to said first signals for computing therefrom a third signal which forms a measure of the theoretical field strength at the receiver, comparing means responsive to said second and third signals for producing an error signal, and error corrector means responsive to said error signal for correcting said first signal to provide a corrected range output signal.

6. A system for determining the true range from a transmitter to a receiver which receives signals from the transmitter, and wherein the power of the transmitter is known, said system including in combination, range determining means responsive to the received signals for producing a first signal which is a measure of the observed range, error corrector means for correcting said first signal to provide an output signal representing true range, first field strength computer means responsive to the received signal for providing a second signal indicating the strength of the received signal, second field strength computer means responsive to said output signal and to the known transmitter power for providing a third signal representing the theoretical field strength at the receiver of signals from the transmitter, comparator means responsive to said second and third signals for producing an error signal representing the error in the true range, and means applying said error signal to said error corrector means, said error corrector means correcting said output signal in accordance with said error signal.

7. A system for determining the true range from a transmitter to a receiver which receives signals from the transmitter including in combination, range determining means responsive to the received signals for producing a first voltage which is a measure of the observed range, range corrector means responsive to the first voltage for compensating said first voltage for predetermined characteristics of the observed range to provide a second voltage, error corrector means for correcting said second voltage to provide a third voltage representing true range, first field stength computer means responsive to the received signal for providing a first signal indicating the strength of the received signal, second field strength com- puter means responsive to said third voltage for providing a second signal representing the theoretical field strength at the receiver of signals from the transmitter, and comparator means responsive to said first and second signals for producing a fourth voltage representing the error in the true range indicated by the third voltage, and means applying said fourth voltage to said error corrector means for correcting said third voltage to thereby correct the representation of the true range.

8. A system for determining the true range from a transmitter to a receiver which receives signals from the transmitter including in combination, measuring means responsive to the received signals for producing a first voltage which is a measure of the time required for the signal to move from the transmitter to the receiver, converting means responsive to the first voltage for producing a second voltage representing the observed range, range corrector means responsive to the second voltage for compensating said second voltage for predetermined characteristics at the observed range to provide a third voltage, error corrector means for correcting said third voltage to provide a fourth voltage representing true range, first field strength computer means responsive to the received signal for providing a first signal indicating the strength of the received signal, second field strength computer means responsive to said fourth voltage for providing a second signal representing the theoretical field strength of signals from the transmitter at the receiver, and comparator means responsive to said first and second signals for producing a fifth voltage representing the error in the true range indicated by the third voltage, and means applying said fifth voltage to said error corrector means for correcting said fourth voltage to thereby correct the representation of the true range.

9. The method of determining the true range from a transmitter to a receiver which receives signals from the transmitter including the steps of, deriving from the received signal a first signal which is a measure of the observed range, compensating said first signal for predetermined characteristics over the observed range to provide a second signal, deriving from the received signal a third signal indicating the field strength of the received signal, computing a fourth signal representing the theoretical field strength at the receiver of signals from the transmitter, comparing said third and fourth signals to produce an error signal representing the anomaly error in the adjusted range, and correcting said second signal by said error signal to provide an output signal representing true range.

10. The method of determining the true range from a transmitter to a receiver which receives signals from the transmitter including the steps of, deriving from the received signal a first signal which is a measure of the time required for the received signal to move from the transmitter to the receiver, converting said first signal into a second signal representing the observed range, compensating said second signal for predetermined characteristics over the observed range to provide a third signal, deriving from the received signal a fourth signal indicating the field strength of the received signal, computing a fifth signal representing the theoretical field strength at the receiver of signals from the transmitter, combining fourth and fifth signals to produce an error signal representing the anomaly error in the adjusted range, and correcting said third signal by said error signal to provide an output signal representing true range.

11. A field strength measuring system for use with a radio receiver including in combination, field strength measuring means coupled to the receiver and responsive to the received signal for producing a first signal representing the field strength of the received signal, range determining means coupled to the receiver and responsive to the received signal for producing a second signal which is a measure of the observed range, computer means responsive to said second signal for computing therefrom a third signal which forms a measure of the anomaly error in the measured field strength, and error corrector means responsive to said third signal for correcting said first signal to provide a corrected field strength signal.

12. In a radio system including a receiver which receives signals from a transmitter and wherein the true range from the transmitter to the receiver is known, a system for determining transmitter power from the received signal including in combination, field strength measuring means coupled to the receiver and responsive to the received signal for producing a first signal representing the field strength at the receiver, range determining means coupled to the receiver and responsive to the received signal for producing a second signal which is a measure of the observed range, range comparator means responsive to said second signal and to the true range for computing therefrom a third signal which forms a measure of the anomaly range error, converter means for converting said third signal representing range error to an error signal representing the corresponding error in the measured field strength, error corrector means responsive to said error signal for correcting said field strength signal to provide a fourth signal, and means responsive to the true range for converting said fourth signal to a signal which forms a measure of the radiated power at the transmitter.

13. In a radio system including a receiver which receives signals from a transmitter and wherein the true range from the transmitter to the receiver is known, a system for determining transmitter power from the received signal including in combination, field strength measuring means coupled to the receiver and responsive to the received signal for producing a first signal representing the field strength at the receiver as related to a standard signal, range determining means coupled to the receiver and responsive to the received signal for producing a second signal which is a measure of the observed range, range comparator means responsive to said second signal and to the true range for computing therefrom a third signal which forms a measure of the anomaly range error, converter means for converting said third signal representing range error to an error signal representing the corresponding error in the measured field strength, error corrector means responsive to said error signal for correcting said field strength signal to provide a fourth signal, computer means responsive to the true range for providing a fifth signal representing the ratio of true radiated transmitter power to the field strength at the receiver, and means for combining said fourth and fifth signals to provide an output signal which forms a measure of the true radiated power at the transmitter.

14. The method of measuring the field strength at a radio receiver from signals received thereby including the steps of, deriving from the received signal a first signal representing the field strength of the received signal, deriving from the received signal a second signal which is a measure of the observed range, computing from said second signal a third signal which forms a measure of the anomaly error in the measured field strength, and combining said third signal with said first signal to provide a corrected field strength signal.

15. In a radio system including a receiver which receives signals from a transmitter and wherein the true range from the transmitter to the receiver is known, the method for determining transmitter power from the received signal including the steps of, deriving from the received signal a first signal representing the field strength of the received signal, deriving from the received signal a second signal which is a measure of the observed range, computing from said second signal and the true range a third signal which forms a measure of the anomaly range error, converting said third signal representing range error to an error signal representing the corresponding error in the measured field strength, correcting said field strength signal by said error signal to provide a fourth signal, and deriving from said fourth signal an output signal which forms a measure of the radiated power at the transmitter in accordance with the true range from the transmitter to the receiver.

16. In a radio navigation system wherein the position of a receiving station is computed from the differences in the ranges from a plurality of transmitting stations, the combination including, receiver means at the receiving station for receiving signals from the plurality of transmitting stations, first computer means responsive to the received signals for deriving therefrom first signals representing the differences in the ranges from the transmitting stations to the receiving station, field strength measuring means responsive to the amplitudes of received signals for producing second signals representing the field strengths at the receiving station of signals from the transmitting stations, second computer means responsive to said first signals for computing therefrom third signals which form measures of the theoretical field strengths at the receiving station of signals from the transmitting stations, comparing means responsive to said second and third signals for producing anomaly error signals, and means coupled to said first computer means and to said comparing means for applying said error signals to said first signals for correcting the same.

17. In a radio navigation system wherein the position of a receiving station is computed from the differences in the ranges from a plurality of transmitting stations at known positions, the combination including, receiver means at the receiving station for receiving signals from the plurality of transmitting stations, computer means including a first portion responsive to the received signals for deriving first signals representing the differences in the ranges from the transmitting stations to the receiving station, a second portion responsive to said first signals for deriving information as to the position of the receiving station, a third portion for deriving information as to the ranges from the transmitting stations to the receiving station, and a fourth portion for deriving second signals which form measures of the theoretical field strengths at the receiving station of signals from the transmitting stations, field strength measuring means responsive to the amplitude of received signals for producing third signals representing the field strengths at the receiving station of signals from the transmitting stations, comparing means responsive to said second and third signals for producing anomaly error signals, and means coupled to said computer means and to said comparing means for applying said error signals to said first signals for correcting the same.

18. In a radio navigation system wherein the position of a receiving station is computed from the differences in range from a plurality of transmitting stations, the method including the steps of, receiving at the receiving station signals from the plurality of transmitting stations, deriving from the received signals first signals representing the differences in range from the transmitting stations to the receiving station, deriving from the received signals second signals representing the field strengths at the receiving station of signals from the transmitting stations, computing from said first signals third signals which form measures of the theoretical field strengths at the receiving station of signals from the transmitting station, comparing said second and third signals to produce anomaly error signals, and applying said error signals to said first signals for correcting the same.

No references cited.

CHESTER L. JUSTUS, *Primary Examiner.*

C. E. WANDS, *Assistant Examiner.*